United States Patent [19]

Stokes

[11] Patent Number: 4,897,824
[45] Date of Patent: Jan. 30, 1990

[54] SONAR SYSTEMS

[76] Inventor: Peter J. Stokes, P.O. Box 532, Southport Queensland, Australia, 4215

[21] Appl. No.: 308,269

[22] Filed: Feb. 9, 1989

[30] Foreign Application Priority Data

Feb. 11, 1988 [AU] Australia ............... PI6703

[51] Int. Cl.⁴ ............................. H04R 15/00
[52] U.S. Cl. .................... 367/173; 367/104; 367/179; 33/378; 33/396
[58] Field of Search ............... 181/140, 141; 367/104, 367/107, 108, 109, 110, 111, 112, 113, 114, 115, 116, 165, 166, 171, 173, 179, 188, 908; 33/378, 391, 396; 441/22; 73/305, 307, 309, 311, 314, 317, 319, 320, 321, 322, 322.5, 170 R, 170 A, 444, 448, 451, 454

[56] References Cited

U.S. PATENT DOCUMENTS

| | | | |
|---|---|---|---|
| 1,348,538 | 8/1920 | Blake | 367/173 |
| 2,703,397 | 3/1955 | Ruble | 367/173 |
| 2,722,056 | 11/1955 | Stimler | 33/378 X |
| 2,832,944 | 4/1958 | Kessler | 367/173 |
| 3,518,676 | 6/1970 | Kirkness | 367/173 |
| 3,563,335 | 2/1971 | Holmes et al. | 367/173 |
| 3,980,984 | 9/1976 | Bridge | 367/173 |
| 4,096,638 | 6/1978 | Schimming | 33/378 X |
| 4,144,518 | 3/1979 | Minohara et al. | 367/173 |

Primary Examiner—Brian S. Steinberger
Attorney, Agent, or Firm—Wood, Dalton, Phillips Mason & Rowe

[57] ABSTRACT

A sonar system for a water craft including a transducer assembly mounted to the hull of the water craft, and a control circuit for applying signals to the transducer for forward transmission by the transducer and for sensing signals reflected from objects forwardly of the craft and for causing actuation of an alarm. The transducer assembly is mounted for pivotal movement relative to the hull such that during pitching motion of the craft, the signals transmitted by the transducer remain in a horizontal plane.

8 Claims, 3 Drawing Sheets

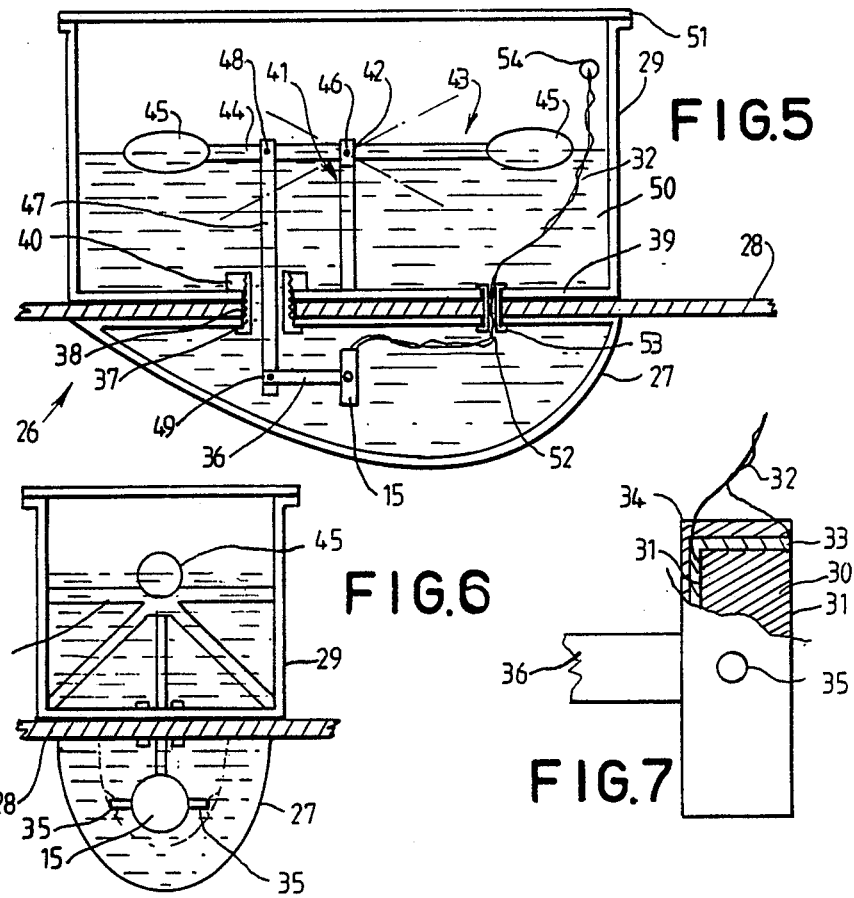
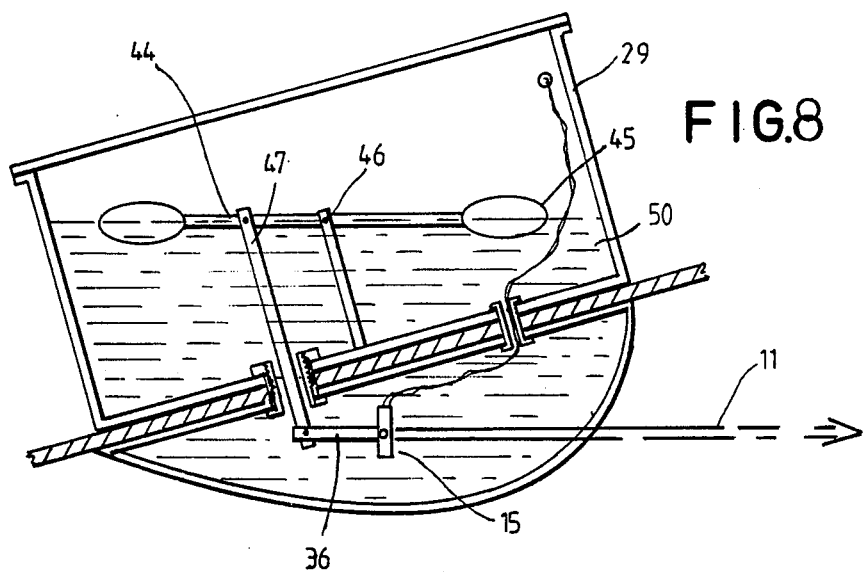

SONAR SYSTEMS

BACKGROUND OF THE INVENTION

1. Field of the Invention

This invention relates to improvements to sonar systems and in particular to sonar systems for relatively small water craft such as yachts or pleasure craft.

2. Description of the Related Art

Sonar and scanning radar systems which are presently available are relatively complex and normally incorporate means for scanning in all directions namely to port, starboard, forward and aft of a vessel and in some cases vertically downwardly for depth measurement. Signals from such systems indicative of the location of an obstruction such as a reef are displayed on suitable visual display means such as cathode ray tubes or via liquid crystal displays or light emitting diodes. The above systems also often employ complex transducer assemblies which may comprise single transducers which may be pivoted through a range of angles by means of servo-motors, electromagnets, solenoids or other motive devices. Alternatively, a series of spaced transducers are provided, each of which is successively activated. The above types of transducer assemblies are unreliable when placed in a salt water environment due to electrolysis problems. Furthermore, in many situations, the transducer assemblies must be supported in gimbals and stabilised to compensate for the pitching and rolling of the vessel. The above sonar systems are also expensive and generally only suited to use with large navel vessels.

BRIEF SUMMARY OF THE INVENTION

The present invention aims to overcome or alleviate one or more of the above disadvantages by providing a sonar system for use with relatively small vessels such as yachts or pleasure craft and which will be operative to indicate the presence of a sub-surface obstruction such as a reef, sandbank, container, whale or other obstruction generally forwardly of the craft. The present invention also aims to provide a sonar system which is unaffected by pitching of the craft, which is reliable and efficient in use, and which is relatively inexpensive. Other objects and advantages of the invention will become apparent hereunder.

With the above and other objects in view, the present invention resides broadly in a sonar system for water craft, said sonar system including transducer means adapted to be mounted to said water craft, control means associated with said transducer means and adapted to cause said transducer means to transit scanning signals forwardly of said craft, alarm means associated with said control means, said alarm means being actuable in response to receipt by said transducer means of signals reflected from an object or objects forwardly of said craft, and means for mounting said transducer means to said craft and operative to maintain said transducer means in an attitude whereby said scanning signals are transmitted in a substantially horizontal plane during pitching motion of said water craft.

Preferably, said transducer means is adapted to be mounted to said water craft for pivotal movement about an axis extending generally transversely of said craft and adjustment means are associated with said transducer means and operative to cause pivotal movement of said transducer means about said axis when said water craft is subject to said pitching motion. Suitably, the adjustment means includes container means adapted to be mounted to said watercraft for movement therewith, a liquid such as a light oil in said container means, and means responsive to the change of the level of said liquid relative to said container means consequent upon pitching motion of said water craft for causing said pivotal movement of said transducer means. Preferably, said liquid level responsive means includes float means, said float means being supported for pivotal movement in said container means and wherein the pivotal attitude of said float means varies in response to changes in liquid level relative to said container means.

Most preferably, said float means includes a pair of floats disposed at opposite ends of a support arm, and means are provided in said container means for pivotally supporting said support arm in said container means intermediate its ends, and link means pivotal interconnect said support arm and said transducer means.

Suitably, the transducer means is supported in housing means adapted to be mounted externally to the hull of said water craft, said housing means communicating with said container means and containing said liquid. Preferably, the housing means and said container means communicate through an aperture in said hull and the link means extend through said hull aperture. Most preferably, the transducer means includes a pair of trunnions on opposite sides thereof, said trunnions supporting said transducer means in said housing means for said pivotal movement. A pivot arm may be secured to said transducer means to extend rearwardly therefrom, said link means being pivotally connected to said pivot arm.

Preferably, the control means includes transceiver means, and means for triggering said transceiver means whereby to cause emission of a signal from said transducer means and said transceiver includes receiver means for responding to receipt of said reflected signals for causing actuation of said alarm means.

The alarm means may comprise a visual alarm such as a warning light or lights, an audible alarm such as a buzzer or siren or a combination of both. Preferably switching means are provided so as to enable the range and thus object sensing distance to be selectively varied.

BRIEF DESCRIPTION OF THE DRAWINGS

In order that the invention may be more readily understood and put into practical effect, reference will now be made to the accompanying drawings which illustrate a preferred embodiment of the invention and wherein:

FIG. 5 is a side cut-away view of the transducer assembly according to the invention;

FIG. 6 is a front elevational view of the transducer assembly of FIG. 5;

FIG. 7 is an enlarged cut-away view of the transducer; and

FIG. 8 illustrates the operation of the transducer assembly during pitching movement of the water craft;

DETAILED DESCRIPTION OF THE INVENTION

Figure 1:
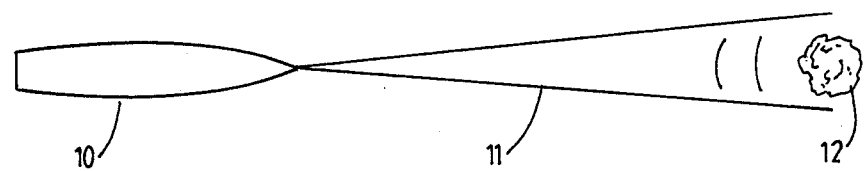
FIG. 1 is a schematic plan view illustrating the principles of the present invention.

Referring to the drawings and firstly to FIG. 1 there is illustrated schematically a water craft 10 fitted with a sonar system according to the present invention which is adapted to produce a scanning beam 11 which is transmitted generally forwardly of the craft 10. The beam 11 is relatively narrow widthwise in the horizontal direction so as to mainly reflect from objects 12 located in front of the craft such as sandbanks, reefs, whales, containers or the like.

Figure 2:
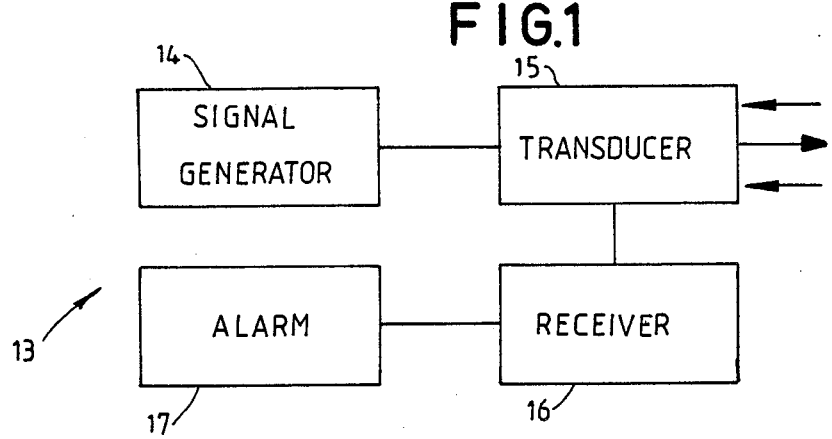
FIG. 2 is a schematic block diagram of the sonar system according to the invention.
Figure 4:
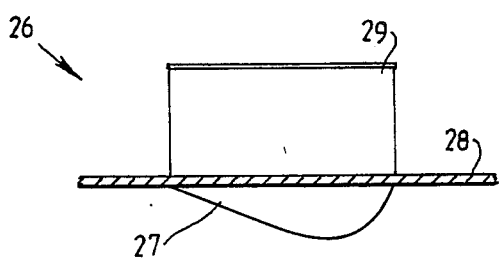
FIG. 4 is a view illustrating the manner of mounting the transducer assembly of the system to a water craft.

As shown in FIG. 2, the sonar system 13 includes signal generating means 14 adapted to apply to a suitable transducer 15 the signal to be transmitted thereby. A receiver 16 is also associated with the transducer 15 and is adapted to sense transmitted signals reflected from the objects 12 and receive by the transducer 15 whilst alarm means 17 are adapted to provide a visual and/or audible alarm in response to receipt of reflective signals by the receiver 16. The visual alarm may comprise warning lights whilst the audible alarm may comprise a buzzer, siren or the like so that the presence of an object forwardly of a craft can be quickly indicated and evasive action may be taken.

Figure 3:
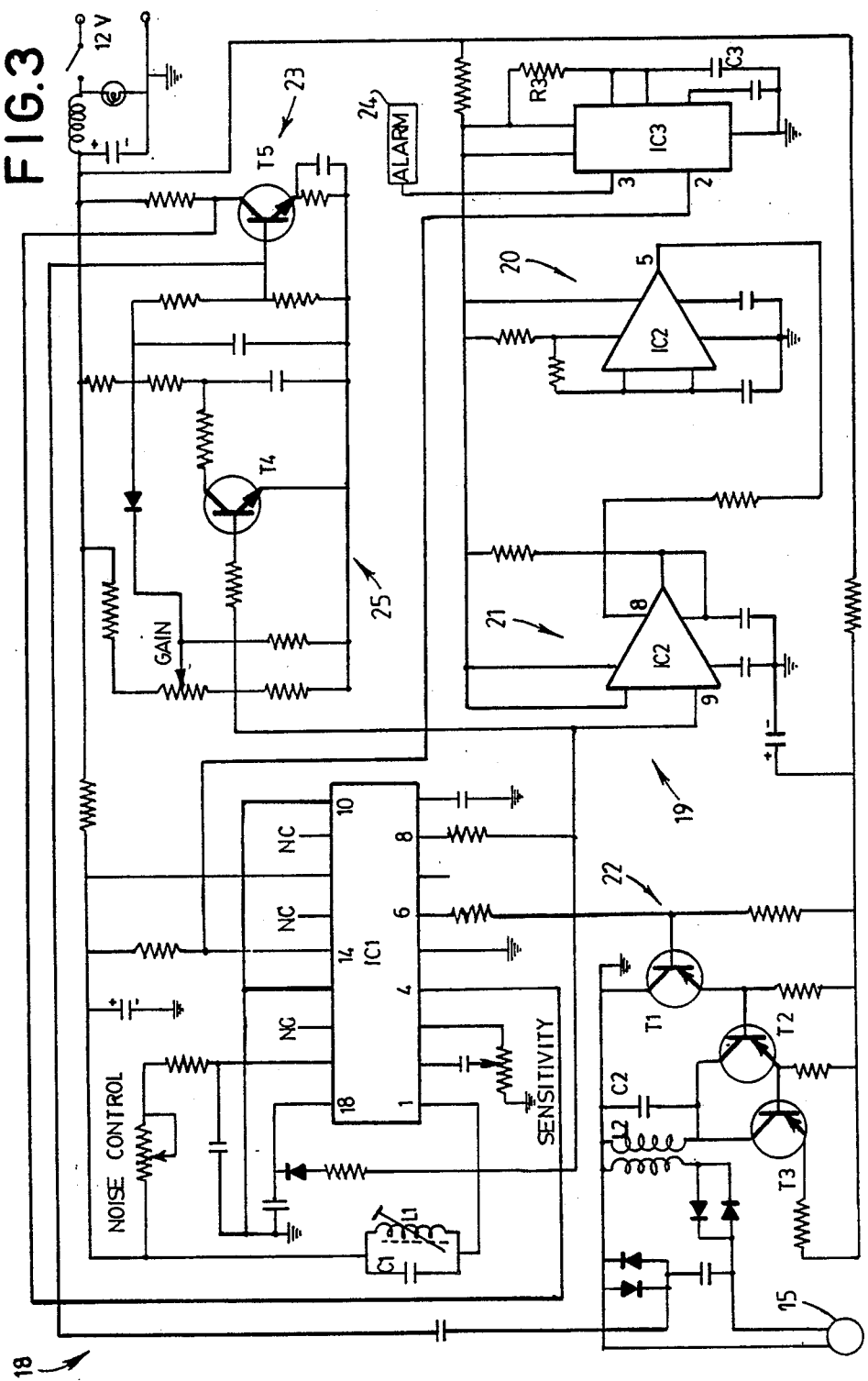
FIG. 3 is a circuit diagram for the sonar system of FIG. 1.

FIG. 3 illustrates a preferred circuit 18 of the system of the invention which is based around an integrated circuit IC1 which comprises an ultrasonic transceiver and preferably a type LM1812 manufactured by the National Semiconductor Corporation. Transmit operation of the transceiver IC1 is controlled by a time base generator 19 which includes a dual timer IC2 and preferably a National Semiconductor Corporation integrated circuit type LM556. One half of IC2, 20 is connected in a circuit to generate negative going pulses at the output pin (5) with in this embodiment a repetition rate of approximately one per second. The output from pin (5) is connected to the trigger input (8) of the other half 21 of the dual timer IC2 which inverts the negative pulse input and provides a pin (9) a positive going pulse in this embodiment of one millisecond duration.

The output pin (9) of IC2 is connected via a resistor to the transmit actuator pin (8) of the transceiver IC1 so as to cause the transceiver to adopt a transmit mode and generate an output signal at pin (6) in the form of a burst of oscillations having a frequency determined by the tuned circuit L1-C1. The output pin (6) is connected to an amplifier 22 comprising cascaded transistors T1, T2 and T3 with the output signal from the amplifier 22 being transformed via the L-C circuit L2-C2 to a suitable level to drive the transducer 15 and cause emission of a signal therefrom for a period determined by the time that the transceiver IC1 is maintained in the transmit mode by the time base generator 19. The triggering pulse from the time base generator 19 is also applied to pin (18) of the transceiver so that the receiver therein will not respond to generation of the output signal and provide a false actuation of the alarm.

When the output of the time base generator 19 is removed or zero, the transceiver IC1 adopts a receive mode until a signal from the time base generator 19 is again received at the transmit pin (8). During this time, the transceiver IC2 is responsive to receipt of signals by the transducer 15. The transducer 15 is also connected to a transistor amplifier circuit 23 including transistor T5, the output of which is coupled to the input pin (4) of the transceiver IC1. Thus when a signal is received by the transducer 15, the signal is amplified by the circuit 23 and applied to the transceiver pin (4). This will cause an output to appear at output pin (14) of the transceiver IC1. This output pin (14) is connected to the input pin (2) of a further integrated circuit IC3 which comprises a LM555 timer connected in a monostable mode to provide an output at pin (3) for a duration determined by the resistor capacitor circuit R3-C3. Pin (3) of IC3 is connected to an alarm 24 which may comprise a buzzer or siren and/or a light or LED display.

The circuit also includes a further amplifier stage 25 including transistor T4 which is connected to the output at pin (9) of the amplifier 21 so as to also receive the generated triggering pulse. The output of amplifier stage 25 is connected to the input of the amplifier 23. This arrangement ensures that the amplifier stage 23 is turned off at all times when a triggering pulse is outputted from the time base generator 19 so as to be unaffected by, and protected from the transmit signal applied from the transceiver IC1 to the transducer 15.

To ensure that the beam transmitted by the transducer 15 remains in a substantially horizontal plane, the transducer 15 is supported for damped pivotal movement about a substantially horizontal axis extending transversely of the craft to which the transducer 15 is mounted. For this purpose, the transducer 15 is incorporated into the transducer assembly 26 shown more clearly in FIGS. 4 to 7. This assembly 26 includes an outer hollow bulbous housing 27 in which the transducer 15 is supported and which is secured externally to the hull 28 of the watercraft. The housing 27 is preferably formed of a transparent plastics material and its shape is such as to provide minimum resistance to the flow of water past the hull 28. Located on the inside of the hull 28 for example in the bilges opposite the housing 27 is a hollow tank 29 which includes means to maintain the transducer in an attitude such as to maintain the transmitted beam therefrom substantially horizontal.

The transducer 15 as shown in FIG. 7 comprises a slab 30 of barium titanate with layers of silver 31 on opposite sides to which respective connecting wires 32 are secured. The rear of the transducer and the side edges are encased in a cork impregnated rubber material 33 so that the transducer 15 only radiates from the front face with the material 33 absorbing radiation from the sides and the rear. The material 33 is also preferably supported in a resin block 34 which carries a pair of opposite trunnions 35 which engage in holes or slots in the sides of the housing 27 so that the transducer 15 is supported for movement about a substantial horizontal transverse axis. The resin block 34 also carries a rearwardly extending pivot arm 36 the purpose of which will hereinafter become apparent.

The housng 27 includes a tubular externally threaded extension portion 37 which extends through an aperture 38 in the hull 28 and which passes through a base wall 39 of the tank 29 to engage with a nut 40 so as to retain the housing 27 to the hull 28. Preferably, a sealant such as a silicon sealant is provided about the nut 40 to ensure that the tank 29 is sealed for communication only with the interior of the housing 19. A similar sealant is provide about the threaded portion 37 to seal the hull 28 about the aperture 38.

The tank 29 in this embodiment is of rectangular box-like form and a support bracket 41 is disposed therein and defines a pivot mounting 42 for a float assembly 43. The float assembly 43 includes an arm 44 provided at each end with floats 45, the arm being pivotally mounted centrally to the mounting 42 for pivotal movement about a pivot axis 46. The pivot axis is disposed at a position at the centre of the tank 29 defined by the intersection of diagonal lines of the sides walls of the tank 9.

A connecting link 47 is pivotally connected at 48 at one end to the float arm 44 and at its opposite end at 49 to the transducer arm 36 and the link 45 extends through the tubular portion 37 as shown. The distance between the pivot connection 36 and the pivot axis 46 is the same as the distance between the pivot connection 47 and pivot axis of the trunnions 35 so that the link 47 and arms 36 and 44 form a parallelogram type and so that pivotal movement of the float arm 44 causes a corresponding pivotal movement of the transducer arm 36.

The tank 29 is filled with a liquid and preferably a viscous liquid 50 such as a light clear oil up to the level of the pivot axis 46 such that the floats 45 will follow the level of the oil and thus cause the transducer arm 36 to follow that level. The oil 50 also fills the housing 27 through the hollow portion 37 as shown. The top of the tank 29 is closed by a removable lid 51 so as to allow filling with the oil and adjustment of the mechanism as desired.

As shown in FIG. 8, when the fore and aft attitude of the tank 29 changes for example consequent upon pitching of the water craft 10, the level of the liquid 50 will remain substantially horizontal and the float arm 44 by virtue of the floats 45 lying along the surface of the liquid 50 will follow the liquid surface. The arm 44 will thus pivot about the axis 46 and this movement will cause via the link 47 a corresponding pivotal movement of the arm 46 about the axis of the trunnions 35 so that the arm 44 will also remain in a substantially horizontal attitude ensuing that the beam 11 emitted by the transducer 15 also maintains this attitude irrespective of the attitude of the tank 29. The beam 11 will thus reflect from any subsurface objects forwardly of the craft 10 irrespective of the pitching movement of the craft 10.

The viscosity of the liquid 50 is such as to dampen movement of the arm 44 and this dampening effect may be enhanced by suitably placed baffles in the tank 29. Alternately or in addition the liquid 50 may be selected to have different viscosities in accordance with the extent of damping required. The liquid 50 which as stated above also fills the housing 27 ensures that the various pivots and connection points of the arms and link remain lubricated at all times.

It will be apparent that as the adjustment mechanism for the transducer 15 is wholly mechanical, no external power supplies are required (apart from the supply for generating and receiving the signal) so that the system is suited particularly to situations where low power drain of a battery is preferred such as in sailing vessels. In alternative configurations, the tank 29 may be sealed from the housing 27 by for example sealing means between the link 47 and tubular portion 37.

The connection wires 32 to the transducer 15 suitably pass through a further aperture 52 in the hull 28 and skin fitting 53 to a socket 54 in a side wall of the tank 29 for connection to the circuit of FIG. 3. Alternatively, the wires 32 may be passed through the tubular portion 37 for connection to the socket 54.

The system of the invention may be mounted to any watercraft and the transducer assembly 26 fitted to the hull preferably along the keel or adjacent the keel of the watercraft. Suitably also the transducer assembly is fitted to the hull at a position of maximum draft of the hull so that obstructions at this depth can be detected.

Many different means may be provided for supporting and maintaining the transducer beam in a horizontal attitude other than that illustrated and described. For example, the transducer may be supported from, or its attitude controlled by a weighted pendulum arrangement which may if desired be damped. Other arrangements for supporting the transducer to ensure that the emitted beam remains in substantially horizontal attitude during pitching movement of the vessel will be apparent to persons skilled in the art.

The transducer 15 may instead of being formed of barium titanate comprise and piezo-ceramic type transducer and if desired, one transducer may be used for transmitting the signal and a further transducer used for receiving the reflected signal.

What I claim is:

1. An apparatus adapted to be mounted to a water craft to sense the presence of objects forwardly of said craft, said apparatus including a transducer assembly adapted to be mounted to the hull of said water craft, said transducer assembly including a hollow housing adapted to be secured to the outside of said hull, a transducer supported pivotally in said housing for movement about an axis extending tranversely and abeam of said water craft, control means connected to said transducer so as to cause said transducer to transmit scanning signals forwardly of said craft and for sensing receipt of said transducer of scanning signals reflected from objects forwardly of said craft, and adjustment means for pivotally adjusting said transducer about said axis upon pitching movement of said craft whereby to maintain said scanning signals transmitted by said transducer in a substantially horizontal plane, said adjustment means including containing means disposed adjacent said housing and adapted for location on the side of said hull opposite said housing, said container means being in communication with said housing, a liquid filling said housing and partially filling said container means so as to define a liquid surface within said container means, float means within said container means and disposed on or adjacent said liquid surface and link means interconnecting said float means and said transducer whereby movement of said liquid surface and thus said float means relative to said container means consequent upon pitching movement of said craft is transmitted said link means to said transducer.

2. An apparatus according to claim 1 and including alarm means connected to said control means, said alarm means being actuable in response to receipt of said transducer of signals reflected from objects forwardly of said craft.

3. An apparatus according to claim 1 wherein said float means is supported in said container means for pivotal movement about an axis extending transversely of said water craft and parallel to said pivot axis of said transducer whereby the pivotal attitude of said float means varies in response to change of attitude of said liquid surface relative to said container means.

4. An apparatus according to claim 3 wherein said float means includes a support arm and a pair of floats disposed at spaced apart positions along said support arm, means for pivotally supporting said support arm intermediate said floats in said container means, and link means pivotally interconnecting said support arm and said transducer.

5. An apparatus according to claim 4 wherein said transducer includes a pair of trunnions on opposite sides thereof, said trunnions supporting said transducer means in said housing for pivotal movement.

6. An apparatus according to claim 5 and including a pivot arm secured to said transducer means and extending rearwardly therefrom, said link means being pivotally connected to said pivot arm.

7. An apparatus according to claim 1 wherein said control means includes transceiver means, means for triggering said transceiver means whereby to cause emission of scanning signals from said transducer and said transceiver including receiver means for sensing receipt of said reflected signals by said transducer.

8. In combination, a water craft having a hull and apparatus for sensing the presence of objects forwardly of said water craft, said apparatus including a transducer assembly mounted to said water craft hull, said transducer assembly including a hollow housing secured to the outside of said hull, a transducer supported pivotally in said housing for movement about an axis extending transversely and abeam of said water craft, transceiver means connected to said transducer, said transceiver means including signal generating means for generating signals for application to said transducer so as to cause said transducer to transmit scanning signals forwardly of said craft, and receiving means for sensing receipt of said transducer of scanning signals reflected from objects forwardly of said craft, alarm means connected to said receiving means and actuable upon said receiving means sensing receipt of reflected scanning signals by said transducer, and adjustment means for pivotally adjusting said transducer about said axis upon pitching movement of said water craft whereby to maintain said scanning signals transmitted by said transducer in a substantially horizontal plane, said adjustment means including container means disposed adjacent said housing and mounted to said hull so as to be located on the side of said hull opposite said housing, said container means being in communication with said housing, a liquid filling said housing and partially filling said container means so as to define a liquid surface within said container means, float means within said container means and disposed on or adjacent said liquid surface, means for pivotally supporting said float means for movement about an axis extending parallel to said pivot axis of said transducer, and link means pivotally interconnecting said float means and said transducer whereby movement of said liquid surface and thus said float means relative to said container means consequent upon pitching movement of said water craft is transmitted through said link means to said transducer so that said transducer moves about its pivot axis to maintain said transmitted scanning signals in a substantially horizontal plane.

* * * * *